J. DAIN.
MOTOR VEHICLE.
APPLICATION FILED NOV. 7, 1908.
1,120,286. Patented Dec. 8, 1914.
2 SHEETS—SHEET 2.
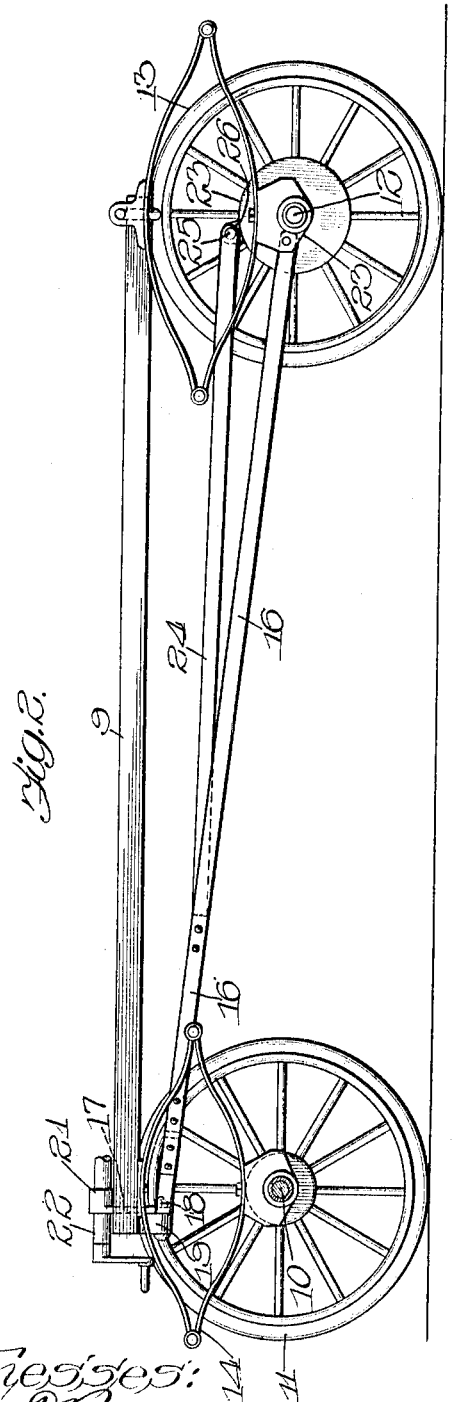
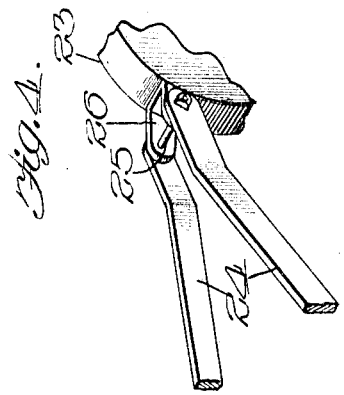
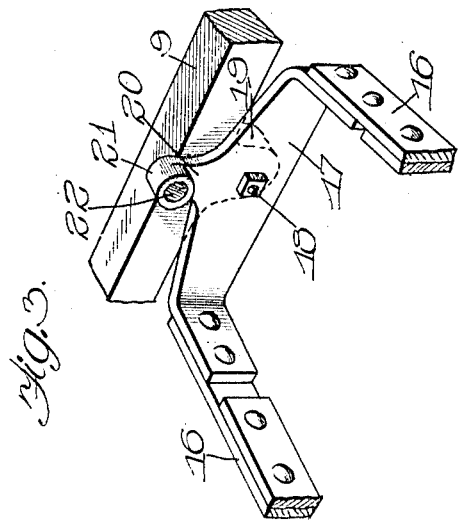

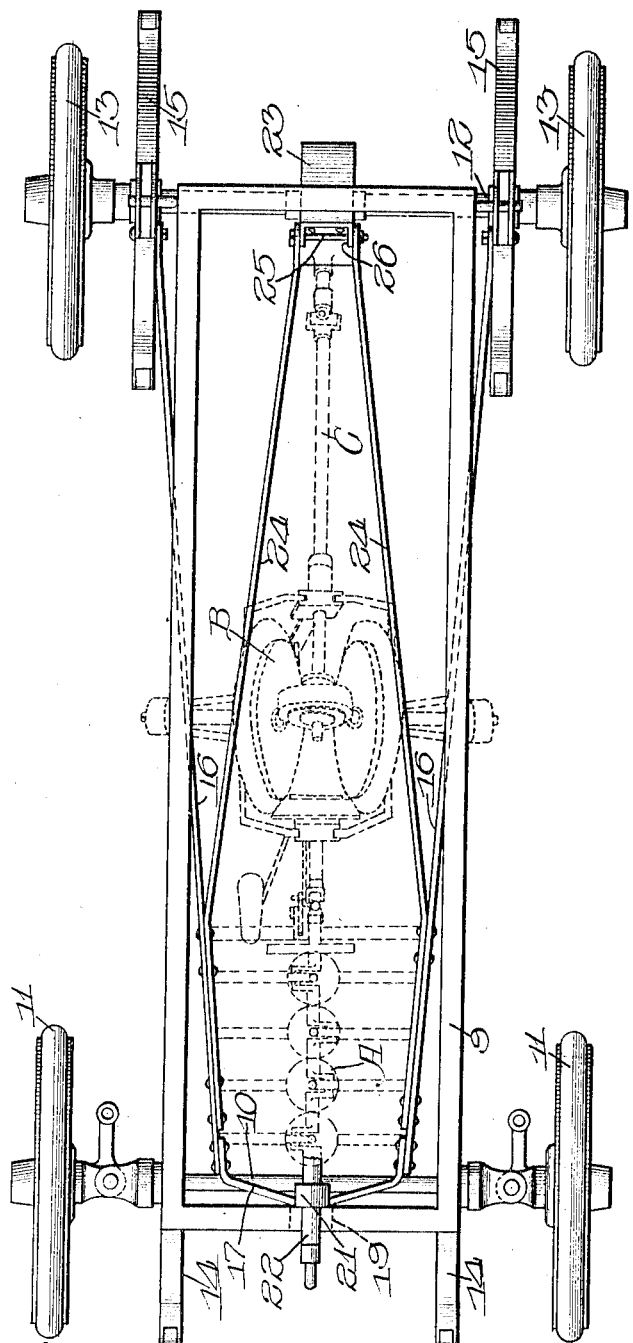

UNITED STATES PATENT OFFICE.

JOSEPH DAIN, OF OTTUMWA, IOWA.

MOTOR-VEHICLE.

1,120,286.  Specification of Letters Patent.  Patented Dec. 8, 1914.

Application filed November 7, 1908. Serial No. 461,569.

*To all whom it may concern:*

Be it known that I, JOSEPH DAIN, a citizen of the United States, residing at Ottumwa, in the county of Wapello and State of Iowa, have invented certain new and useful Improvements in Motor-Vehicles, of which the following is a specification, reference being had to the accompanying drawings.

My invention relates to motor vehicles, and has for its object to provide a new and improved chassis for such vehicles, and particularly one which will be well adapted for use in connection with transmission mechanism such as that illustrated and described in my application Ser. No. 400,371, filed November 2, 1907, and also in my application of even date herewith, in which the transmission is composed principally of two coöperative drive disks angularly disposed with reference to each other and acting to drive an intermediate disk which engages said drive disks and is connected with the usual differential at the rear axle. I accomplish this object as illustrated in the drawings and as hereinafter described.

What I regard as new is set forth in the claims.

In the drawings,—Figure 1 is a plan view of my improved chassis; Fig. 2 is a side view thereof; Fig. 3 is an enlarged detail, being a perspective view of the front portion of the sub-frame; and Fig. 4 is a perspective view of a part of the rear portion of the sub-frame.

Referring to the drawings for a detailed description of my improvements as illustrated therein,—9 indicates the frame of the chassis, which is designed to carry the car body. 10 indicates the front axle; 11 the front wheels; 12 the rear axle, and 13 the rear wheels. It will be understood that these parts are of any well known and approved construction, the front axle having any suitable type of steering knuckles, etc., and the rear axle having the usual differential mechanism. The frame 9 is supported at its ends on front and rear springs 14—15 of any suitable type, and the outer end portions of the rear axle 12 are pivotally connected by converging bars 16 with the front portion of the frame 9, as shown in Figs. 1 and 3,—17 indicating a transverse bar which connects the front ends of said bars 16, as shown in Fig. 3.

18 indicates a pivot connecting the pivot bar 17 with the front portion of the main frame, said frame having a depending arm 19 to receive said pivot, as shown in Figs. 2 and 3, so that the forward portion of the sub-frame lies below the plane of the frame 9. The pivot bar 17 is provided at its center with an upwardly-projecting arm 20 having a sleeve 21 in which is journaled the front end of the usual crank-shaft 22, as shown in Figs. 2 and 3.

The rear ends of the bars 16 connect with the rear axle housing 23, as shown in Figs. 1 and 2, and said housing is braced and prevented from rotating by means of brace-rods 24, which converge rearwardly and are pivotally connected at their rear ends with the upper portion of the housing 23, as best shown in Figs. 2 and 4,—25 indicating a pivot which connects the rear ends of said bars 24 with a stirrup 26, as shown in Fig. 4, the latter being secured fixedly to the housing 23. The forward ends of the bars 24 are connected fixedly to the forward end portions of the bars 16, as shown in Figs. 1 and 2. It will be noted that the bars 16 are substantially in line with the rear axle 12, while the bars 24 extend to the upper portion of the rear axle housing, said housing being connected with the rear portion of the frame 9 through the rear springs 13. Thus the bars 16 and 24 being angularly disposed with reference to each other and connected with the housing at points lying in different horizontal planes, the housing is held rigidly against rotation and the frame as a whole made stronger and more rigid.

The engine A and the transmission mechanism B are mounted on the sub-frame composed of the bars 16, 17 and 24, as indicated in dotted lines in Fig. 1. Preferably I employ the friction-operated transmission described in my applications hereinbefore referred to, but any other suitable transmission and motor may be employed. By thus providing a sub-frame rigidly connected with the rear axle or the rear axle housing and at its forward end pivotally connected with the main frame, which is spring supported on the front axle, and mounting the motor and transmission upon the forward portion of such sub-frame, the transmission and motor are relieved almost wholly of the road shocks and strains to which they are subjected in other constructions. The rear axle housing being rigidly connected with the rear of such sub-frame, there is no rotation thereof about the main drive-shaft C and consequently the differential is not injuriously affected by the dropping of the rear wheels in holes or ruts. So far as I am aware, I am the first in the art to provide the sub-frame rigidly connected with the rear axle housing or with the rear axle, in connection with transmission mechanism and a motor mounted on said sub-frame, and the claims hereinafter made are therefore to be construed accordingly.

That which I claim as my invention, and desire to secure by Letters Patent, is,—

1. A chassis for motor-vehicles, comprising front and rear axles, a housing for the rear axle, a main frame adapted to carry the vehicle body, a sub-frame supported at the front by the main frame and comprising members diverging rearwardly and connected with the end portions of the rear axle housing, and means connected with the sub-frame and with the intermediate portion of the rear axle housing at a point in a different horizontal plane from the rear connections of the sub-frame members.

2. A chassis for motor-vehicles, comprising front and rear axles, a housing for the rear axle, a main frame adapted to carry the vehicle body, a sub-frame supported at the front by the main frame and comprising members diverging rearwardly and connected with the end portions of the rear axle housing, and braces connected with the intermediate portions of the sub-frame members and converging rearwardly and connected with the central portion of the rear axle housing in a different horizontal plane from the rear connections of the sub-frame members.

3. A chassis for motor-vehicles, comprising front and rear axles, a housing for the rear axle, a main frame adapted to carry the vehicle body, a sub-frame pivotally supported at the front by the main frame and comprising members diverging rearwardly and connected with the end portions of the rear axle housing, and means connected with the sub-frame and with the intermediate portion of the rear axle housing at a point in a different horizontal plane from the rear connections of the sub-frame members.

4. A chassis for motor-vehicles, comprising front and rear axles, a housing for the rear axle, a main frame adapted to carry the vehicle body, a sub-frame pivotally supported at the front by the main frame and comprising members diverging rearwardly and connected with the end portions of the rear axle housing, and braces connected with the intermediate portions of the sub-frame members and converging rearwardly and connected with the central portion of the rear axle housing in a different horizontal plane from the rear connections of the sub-frame members.

JOSEPH DAIN.

Witnesses:
MINNIE A. HUNTER,
JOHN L. JACKSON.

Copies of this patent may be obtained for five cents each, by addressing the "Commissioner of Patents, Washington, D. C."